US012027150B2

(12) United States Patent
Su et al.

(10) Patent No.: US 12,027,150 B2
(45) Date of Patent: Jul. 2, 2024

(54) BEAMING SOUND WAVES USING PHONONIC CRYSTALS

(71) Applicant: Toyota Motor Engineering & Manufacturing North America, Inc., Plano, TX (US)

(72) Inventors: Xiaoshi Su, Ann Arbor, MI (US); Debasish Banerjee, Ann Arbor, MI (US)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 20 days.

(21) Appl. No.: 17/864,131

(22) Filed: Jul. 13, 2022

(65) Prior Publication Data

US 2024/0021187 A1 Jan. 18, 2024

(51) Int. Cl.

*G10K 11/26* (2006.01)
*G10K 11/18* (2006.01)
*G10K 11/28* (2006.01)
*H01P 3/12* (2006.01)
*H01P 3/16* (2006.01)

(52) U.S. Cl.

CPC .................................... *G10K 11/28* (2013.01)

(58) Field of Classification Search

CPC ........ G10K 11/28; G10K 11/26; G10K 11/20; G10K 11/18; H01P 3/12; H01P 3/122; H01P 3/16; H01P 3/165; H01P 3/20

See application file for complete search history.

(56) References Cited

U.S. PATENT DOCUMENTS 7,315,663 B2 * 1/2008 Wu ........................ B82Y 20/00 385/9
8,570,643 B2 * 10/2013 Yamada ................. B82Y 20/00 359/577

(Continued)

FOREIGN PATENT DOCUMENTS

CN 104464715 A 3/2015
CN 107424599 A * 12/2017 ............. G10K 11/26

(Continued)

OTHER PUBLICATIONS

Bai, et al., "Extraordinary Lateral Beaming of Sound from a Square-Lattice Phononic Crystal" (https://www. sciencedirect.com/science/article/abs/pii/S0375960116312233) Mar. 3, 2017, pp. 886-889, vol. 381, Issue 9, Published by Elsevier B.V.

(Continued)

*Primary Examiner* — Edgardo San Martin

(74) *Attorney, Agent, or Firm* — Dinsmore & Shohl LLP

(57) ABSTRACT

A method for beaming sound waves includes introducing sound waves into a phononic crystal in a first direction. The phononic crystal has an array of C-shaped structures oriented so that a neck of each of the C-shaped structures is facing the same general direction. The sound waves are beamed in the direction in which the neck of each of the C-shaped structures is facing so that the sound waves are beamed from the phononic crystal in a second direction that is different from the first direction.

14 Claims, 8 Drawing Sheets

(56) References Cited

U.S. PATENT DOCUMENTS

| | | | | |
|---|---|---|---|---|
| 8,596,410 | B2 * | 12/2013 | Deymier | G10K 11/165 181/176 |
| 8,789,652 | B2 * | 7/2014 | Swallowe | G10K 11/172 181/295 |
| 9,465,141 | B2 * | 10/2016 | Steinhardt | G01K 17/00 |
| 9,607,600 | B2 * | 3/2017 | Swallowe | G10K 11/172 |
| 9,765,516 | B2 * | 9/2017 | Van Dinther | E04B 1/8209 |
| 10,128,439 | B1 | 11/2018 | Bilal et al. | |
| 10,783,871 | B2 * | 9/2020 | Norris | G10K 11/30 |
| 11,100,914 | B1 * | 8/2021 | Perahia | G10K 11/18 |
| 11,244,667 | B1 * | 2/2022 | Perahia | G10K 11/04 |
| 11,574,619 | B2 * | 2/2023 | Su | G10K 11/32 |
| 2012/0000726 | A1 | 1/2012 | Deymier et al. | |
| 2012/0149126 | A1 | 6/2012 | Wilson et al. | |
| 2021/0373201 | A1 * | 12/2021 | Steinhardt | G02B 5/3025 |

FOREIGN PATENT DOCUMENTS

| | | | | |
|---|---|---|---|---|
| CN | 107991644 | A | | 5/2018 |
| CN | 208141824 | U | | 11/2018 |
| CN | 109147751 | A | | 1/2019 |
| CN | 111749933 | A | | 10/2020 |
| CN | 113242037 | A | * | 8/2021 |
| CN | 113300688 | A | * | 8/2021 |
| CN | 115273792 | A | * | 11/2022 |

OTHER PUBLICATIONS

Elford, D. P., Chalmers, L., Kusmartsev, F. V., & Swallowe, G. M. (2011). Matryoshka locally resonant sonic crystal. The Journal of the Acoustical Society of America, 130(5), 2746-2755. (https://arxiv.org/pdf/1102.0399.pdf).

* cited by examiner

BEAMING SOUND WAVES USING PHONONIC CRYSTALS

BACKGROUND

Field

The present specification generally relates to methods for beaming sound waves using phononic crystals, and specifically is directed to directional beaming of sound waves using phononic crystals.

Technical Background

Traditional technologies for directing sounds require the use of acoustically hard materials in the form of reflective walls. For example, the sound emitted from a speaker can be directed in another direction by utilizing an acoustic panel and/or of reflective wall. The reflective wall is typically made in acoustically hard material that can reflect a portion of the sounds emitted from the speaker.

Recent research has shown the use of phononic crystals to beam sound waves at different frequencies in different directions. However, the previously-used phononic crystals direct sounds in multiple directions as well as directly through the phononic crystals. Moreover, C-shaped phononic crystals arranged in an array have also been used to attenuate sound waves.

Accordingly, a need exists for phononic crystals that can beam sound in a single direction.

SUMMARY

According to one embodiment, a method for beaming sound waves comprising: introducing sound waves into a phononic crystal in a first direction, the phononic crystal comprising an array of C-shaped structures oriented so that a neck of each of the C-shaped structures is facing the same general direction; and beaming the sound waves in the direction in which the neck of each of the C-shaped structures is facing so that the sound waves are beamed from the phononic crystal in a second direction that is different from the first direction.

In another embodiment, a phononic crystal comprises: an array of C-shaped structures oriented so that a neck of each of the C-shaped structures is facing the same general direction; and the C-shaped structures are configured so that the neck of each of the C-shaped structures is positioned to face a second direction that is different from a direction of sound waves incident to the phononic crystal.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of methods for beaming sound waves with phononic crystals, and phonic crystals used to beam sound waves. In one embodiment, a method for beaming sound waves comprising: introducing sound waves into a phononic crystal in a first direction, the phononic crystal comprising an array of C-shaped structures oriented so that a neck of each of the C-shaped structures is facing the same general direction; and beaming the sound waves in the direction in which the neck of each of the C-shaped structures is facing so that the sound waves are beamed from the phononic crystal in a second direction that is different from the first direction. In another embodiment, a phononic crystal comprises: an array of C-shaped structures oriented so that a neck of each of the C-shaped structures is facing the same general direction; and the C-shaped structures are configured so that the neck of each of the C-shaped structures is positioned to face a second direction that is different from a direction of sound waves incident to the phononic crystal. Various methods for beaming sound and phonic crystal structures for beaming sound will be described herein with specific reference to the appended drawings.

Figures 1A, 1B, 1C:
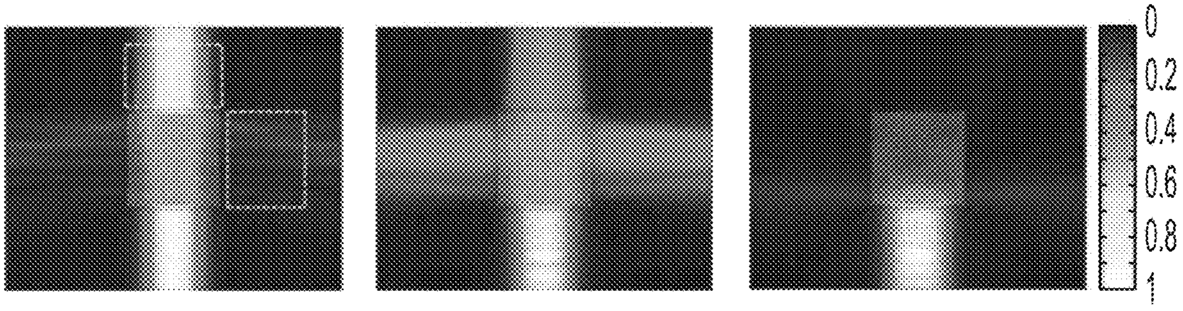
FIG. 1A is an image showing 0.550 MHz energy waves being transmitted through a square phononic crystal.
FIG. 1B is an image showing 0.586 MHz energy waves being transmitted on three sides of a square phononic crystal.
FIG. 1C is an image showing 0.610 MHz sound waves being blocked by a square phononic crystal.

As noted above, recent research has been performed for laterally beaming sound with a phononic square. In this research a single phononic crystal directs sound waves at different frequencies in different directions. However, the square phononic crystal directs sounds in two different lateral directions, as well as directly through the phononic crystal. As shown in FIG. 1A, the square phononic crystal primarily transmits sound waves of 0.550 MHz through the phononic crystal (along the y-axis in FIG. 1A), but some sound waves are also directed out the sides of the square phononic crystal (along the x-axis in FIG. 1A). FIG. 1B shows that the square phononic crystal transmits sound waves of 0.586 MHz through the phononic crystal (along the y-axis in FIG. 1B) and out the sides of the square phononic crystal (along the x-axis in FIG. 1B). FIG. 1C shows that the square phononic crystal essentially blocks sounds waves of 0.610 MHz with small amounts of the sound waves bouncing to the sides of the square phononic crystal (along the x-axis in FIG. 1C). Thus, the square phononic crystal recently research cannot be used to direct sound waves in a single direction.

Other research has shown that an array of C-shaped microstructures can be used to attenuate certain frequencies of sound waves, but the array of C-shaped microstructures was not found to be able to beam sound waves in a discernable direction, they could only attenuate certain frequencies of sound waves passing through the array of C-shaped microstructures.

In contrast, the phononic crystals disclosed and described herein can beam sound waves, such as laterally beaming sound waves, and the phononic crystals disclosed and described herein can beam sound waves, such as laterally beaming sound waves, of a specific frequency as opposed to beaming multiple frequencies of sound waves.

Figure 2:
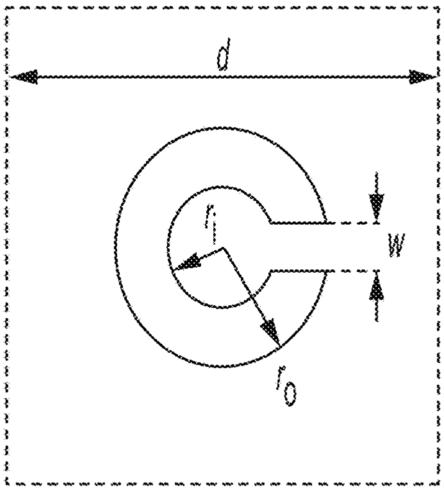
FIG. 2 is a schematic of a C-shaped structure according to embodiments disclosed and described herein.

According to embodiments disclosed and described herein, phononic crystals that can beam sound waves comprise an array of C-shaped structures. The C-shaped structures according to embodiments will now be described with reference to FIG. 2. The C-shaped structures are so-named because the geometry of the C-shaped structures generally resemble the geometry of the letter "C", as shown in FIG. 2. The C-shaped structures have an inner radius $r_i$ and an outer radius $r_o$, where the inner radius $r_i$ is smaller than the outer radius $r_o$. The opening of the C-shaped structure is referred to herein as the neck of the C-shaped structure, which has a width w.

In one or more embodiments, the outer radius $r_o$ of the C-shaped structure satisfies the following equation:

$$kr_o \approx 1$$

where k is the wave number measured in radians per unit distance and $r_o$ is the outer radius of the C-shaped structure. The wavenumber is expressed as $$k = \frac{2\pi}{\lambda}$$

(where λ is the wavelength) and is defined as the spatial frequency of sound, measured in radians per unit distance. In embodiments, approximately equal to (i.e., ≈) in the above equation means±0.1. In embodiments, the outer radius $r_o$ satisfies the following equation:

$$0.97 \leq kr_o \leq 1.05.$$

Accordingly, the outer radius $r_o$, according to embodiments, may be from $$0\frac{0.97\lambda}{2\pi} \text{ and } \frac{1.05\lambda}{2\pi},$$

where λ is the wavelength at the design frequency. The neck of the C-shaped structure has a width w that, according to one or more embodiments, is from 0.25 cm to 0.75 cm, such as from 0.30 cm to 0.70, from 0.35 cm to 0.65 cm, from 0.40 cm to 0.60 cm, from 0.45 cm to cm, or about 0.5 cm.

The C-shaped structures may each have a substantially similar resonance frequency, and may be made from synthetic periodic materials that control and manipulate the propagation of sound waves. In embodiments, the C-shaped structures may be made from material that has a Young's modulus from 2.0 GPa to 4.0 GPa and a density that is from 1.00 kg/m 3 to 3.00 kg/m 3. However, it should be understood that materials having other Young's modulus and other densities may be suitable. According to embodiments, the C-shaped structures may be made any material that is acoustically hard, such as plastics, wood, ceramics, metals, and the like.

Phononic crystals according to embodiments disclosed and described herein will now be described with reference to FIG. 3. The phononic crystal 300 depicted in FIG. 3 comprises an eight by four (8×4) array of C-shaped structures 310 (i.e., eight columns with four rows in each column). It should be understood that phononic crystals disclosed and described herein can comprise an array of C-shaped structures having any size and is not limited to phononic crystal 300 having the 8×4 array shown in FIG. 3. Incident sound waves 321 are incident to the phononic crystal 300 in a first direction (e.g., from the bottom of the y-axis in the phononic crystal 300 depicted in FIG. 3). The C-shaped structures 310 are oriented so that the neck 311 of each of the C-shaped structures is facing in the same general direction referred to herein as the second direction. The C-shaped structures 310 are configured so that the neck 311 of each of the C-shaped structures 310 is positioned to face a second direction that is different from the direction that the incident sound waves 321 are incident to the phononic crystal. Accordingly, the neck 311 of each of the C-shaped structures is facing a second direction that is different from the first direction.

Figure 3:
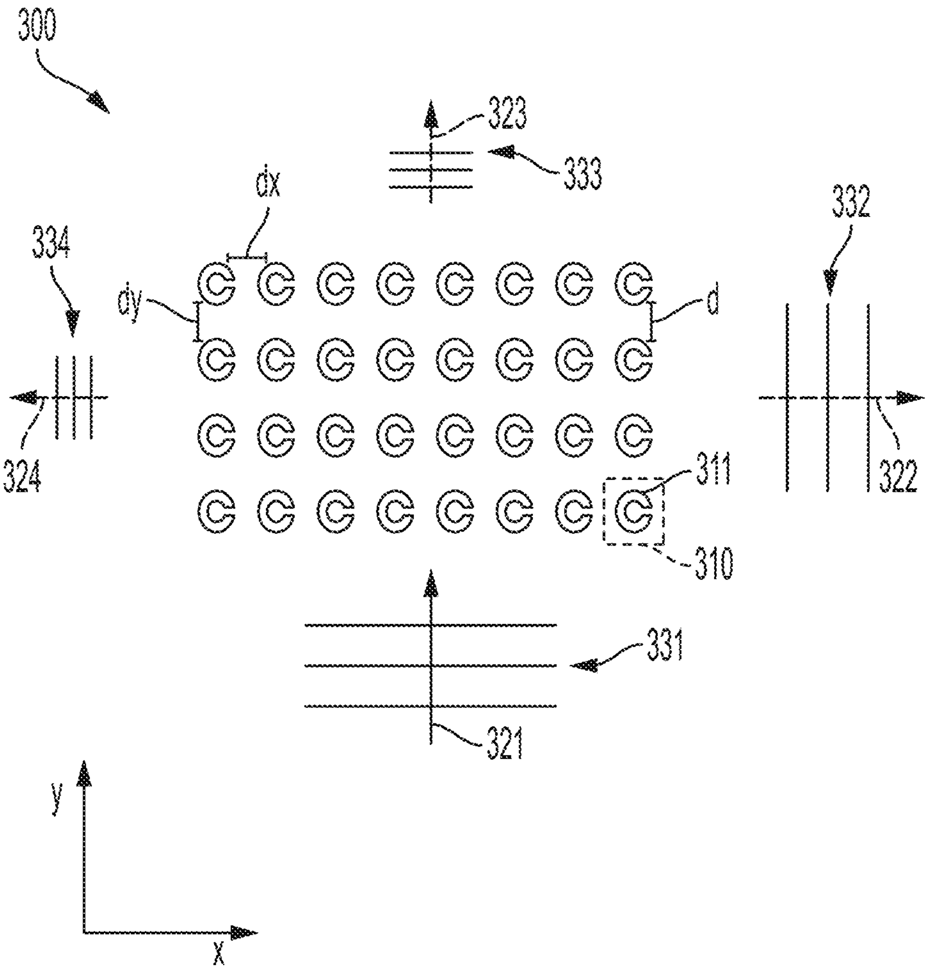
FIG. 3 is a schematic of a phononic crystal constituted of an array of C-shaped structures according to embodiments disclosed and described herein.

For instance, in FIG. 3 incident sound waves 321 enter the phononic crystal 300 via a first port 331, the first port 331 is located at the bottom (of the y-axis) of the phononic crystal 300. Accordingly, in the embodiment depicted in FIG. 3, the neck 311 of each of the C-shaped structures 310 is positioned in a second direction to face a second port 332 of the phononic crystal 300, the second port 332 of the phononic crystal 300 is positioned to the right (of the x-axis) of the phononic crystal 300. It should be understood that in embodiments, the neck 311 of each of the C-shaped structures 310 may be positioned in a second direction to face a third port 333 of the phononic crystal 300, the third port 333 positioned at the top (of the y-axis) of the phononic crystal 300. In embodiments, the neck 311 of each of the C-shaped structures 310 may be positioned in a second direction to face a fourth port 334 of the phononic crystal 300, the fourth port 334 positioned at the left (of the x-axis) of the phononic crystal 300. In one or more embodiments, the neck 311 of each of the C-shaped structures 310 may be positioned in a second direction that is faced between any of the first port 331, the second port 332, the third port 333, or the fourth port 334.

In embodiments, the second direction is from 45° to 135° relative to sound waves that are incident to the phononic crystal, such as from 60° to 135° relative to sound waves that are incident to the phononic crystal, from 75° to 135° relative to sound waves that are incident to the phononic crystal, from 90° to 135° relative to sound waves that are incident to the phononic crystal, from 105° to 135° relative to sound waves that are incident to the phononic crystal, from 120° to 135° relative to sound waves that are incident to the phononic crystal, from 45° to 120° relative to sound waves that are incident to the phononic crystal, from 60° to 120° relative to sound waves that are incident to the phononic crystal, from 75° to 120° relative to sound waves that are incident to the phononic crystal, from 90° to 120° relative to sound waves that are incident to the phononic crystal, from 105° to 120° relative to sound waves that are incident to the phononic crystal, from 45° to 105° relative to sound waves that are incident to the phononic crystal, from 60° to 105° relative to sound waves that are incident to the phononic crystal, from 75° to 105° relative to sound waves that are incident to the phononic crystal, from 90° to 105° relative to sound waves that are incident to the phononic crystal, from 45° to 90° relative to sound waves that are incident to the phononic crystal, from 60° to 90° relative to sound waves that are incident to the phononic crystal, from 75° to 90° relative to sound waves that are incident to the phononic crystal, from 45° to 75° relative to sound waves that are incident to the phononic crystal, from 60° to 75° relative to sound waves that are incident to the phononic crystal, or from 45° to 60° relative to sound waves that are incident to the phononic crystal.

In one or more embodiments, the second direction is approximately 45° relative to sound waves that are incident to the phononic crystal, approximately 60° relative to sound waves that are incident to the phononic crystal, approximately 75° relative to sound waves that are incident to the phononic crystal, approximately 90° relative to sound waves that are incident to the phononic crystal, approximately 105° relative to sound waves that are incident to the phononic crystal, approximately 120° relative to sound waves that are incident to the phononic crystal, or approximately 135° relative to sound waves that are incident to the phononic crystal.

As noted above, and with reference again to FIG. 3, phononic crystals 300 according to embodiments disclosed and described herein comprise an array of C-shaped structures 310. The C-shaped structures 310 are positioned within the array so that there is a distance $d_x$ between each of the C-shaped structures in the x-direction and a distance $d_y$ between each of the C-shaped structures in the y-direction. In embodiments, $d_x$ and $d_y$ are the same and may simply be referred to as d. The distance d between each of the C-shaped structure may satisfy the following equation:

$$f = \frac{c}{d}$$

where f is the (center) frequency of the sound waves entering the phononic crystal, c is the speed of sound in air, and d is the distance between adjacent C-shaped structures. According to embodiments, the (center) frequency f may be defined as the frequency value right in the middle of the device.

In one or more embodiments, d may be from 4.00 cm to 9.00 cm depending on the target frequency. In embodiments, d may be from 4.50 cm to 8.50 cm, from 5.00 cm to 8.00 cm, from 5.50 cm to 7.50 cm, or from 6.00 cm to 7.00 cm. It should be The total number of C-shaped structures in the phononic crystal, as well as the number of rows and number of columns, will be determined by the desired dimensions of the phononic crystal divided by the sum of the outer radius $r_o$ of the C-Shaped structures and the distance d between adjacent C-shaped structures. In embodiments, the overall size of the phononic crystal should be about 4 to 8 wavelength, where the wavelength of the center frequency is the same as d.

Methods for beaming sound waves will now be described with reference again to FIG. 3. Incident sound waves 321 are introduced into the phononic crystal 300 that comprises an array of C-Shaped structures 310. In the embodiment depicted in FIG. 3, incident sound waves 321 are introduced into a first port 331 of the phononic crystal 300 in a first direction (i.e., in the positive y-direction). The C-Shaped structures 310 are oriented so that the neck 311 of each C-shaped structure 310 is facing the same general direction (referred to as the second direction), and that second direction is different from the first direction in which the incident sound waves 321 are introduced into the phononic crystal 300. For instance, in the embodiment depicted in FIG. 3 the C-shaped structures 310 are oriented such that the neck 311 of each of the C-shaped structure 310 is facing a second port 332 position at the right (on the x-axis) of the phononic crystal 300.

The incident sound waves 321 interact with the C-shaped structures 310 and are beamed in the direction in which the neck of the C-shaped structures are facing such that sound waves are beamed from the phononic crystal 300 in a second direction that is different from the first direction. For instance, in the embodiment depicted in FIG. 3, sound waves 322 exit the phononic crystal 300 at the second port 332 position to the right (on the x-axis) of the phononic crystal 300. In embodiments, a lesser amount of sound waves may exit the phononic crystal 300 at other ports. For instance, in the embodiment depicted in FIG. 3, some sound waves 323 exit the phononic crystal 300 at a third port 333 positioned at the top (on the y-axis) of the phononic crystal 300, and some sound waves 324 exit the phononic crystal 300 at a fourth port 334 positioned at the left (on the x-axis) of the phononic crystal 300. However, the sound waves 323 exiting at the second port 332 of the phononic crystal and the sound waves 324 exiting at the fourth port 334 of the phononic crystal 300 are significantly lesser than the sound waves 322 exiting at the second port 332 of the phononic crystal 300. It should also be understood that in embodiments the neck 311 of each of the C-shaped structures 310 may be oriented to face a different direction, such as oriented to face the third port 333 or oriented to face the fourth port 334. In embodiments, the neck 311 of each C-Shaped structure may be oriented to face a point between the first port 331 and the second port 332, a point between the second port 332 and the third port 333, a point between the third port 333 and the fourth port 334, or a point between the fourth port 334 and the first port 331.

Without being bound by any particular theory, the process of beaming sound waves in a lateral direction will now be described. To achieve an asymmetric lateral beaming effect, the sound waves emitted from C-shaped structures must contain asymmetric components. In embodiments, the pressure excited dipole together with a quadrupole response is used to achieve asymmetric lateral beaming described herein. Namely, the pressure excited dipole moment (orthogonal to the incident sound wave direction) from the C-shaped structures is more than five orders of magnitude higher than that from a rigid cylinder. This difference is due to the fact C-shaped structures are asymmetric about the y-axis which causes a pressure-velocity cross-coupling. This cross-coupling induced dipole is not perturbative, as might be expected. In fact, the strength of the pressure excited dipole (orthogonal to the incident sound wave direction) is comparable to the strength of the velocity excited dipole (along the incident sound wave direction).

Previously reported lateral beaming effects for sound waves in water and flexural waves in plates are all symmetric. The reason is that the conventional structures in those designs are non-bianisotropic (i.e., they have no Willis coupling) so that the anti-symmetric modes inside the phononic crystal cannot be excited. However, as shown herein, this symmetry can be broken by using C-shaped structure as disclosed and described herein.

For a phononic crystal, the strongest beaming of sound waves occurs by satisfying the Bragg's condition:

$$n\lambda=2d \sin \theta$$

where n is the order of the Bragg scattering, A is the wavelength of sound waves to be beamed, d is the distance between adjacent C-shaped structures in the array, and Bis the angle of a neck of the C-shaped structures relative to a line perpendicular to the first direction (i.e., a line perpendicular to the direction in which incident sound waves enter the phononic crystal). In embodiments disclosed and described herein, n is 2, but may be another value if a different phononic crystal design is used. The value for λ may be ±10% of the wavelength of sound waves to be beamed. Using the Bragg's condition described above, either d or θ in relation to one another can be determined to configure the array of C-shaped structures within the phononic crystal.

For a specific case in which the incident sound is normal (i.e., about 90° to the phononic crystal), the strongest scattering occurs at a frequency of about 5305 Hz. By tuning the inner radius $r_i$ of the C-shaped structure, the resonant modes inside the phononic crystal can be adjusted to match the Bragg scattering.

In embodiments, the transmission ratio of the intensity of sound waves in the first direction (i.e., the direction of sound waves incident to the phononic crystal) to sound waves in the second direction (i.e., the direction in which the sound waves are beamed) is greater than or equal to than 5.00, where the sound waves have a frequency that is greater than or equal to 5100 Hz and less than or equal to 5400 Hz. Because the transmitted waves are plane waves, the intensity is calculated using $$I = \frac{|p|^2}{Z},$$

where p is measure sound pressure, Z is the acoustic impedance of air. In embodiments, the intensity of sound waves in the first direction to sound waves in the second direction is greater than or equal to 5.00 and less than or equal to 10.00, such as greater than or equal to 5.50 and less than or equal to 10.00, greater than or equal to 6.00 and less than or equal to 10.00, greater than or equal to 6.50 and less than or equal to greater than or equal to 7.00 and less than or equal to 10.00, greater than or equal to 7.50 and less than or equal to 10.00, greater than or equal to 8.00 and less than or equal to 10.00, greater than or equal to 8.50 and less than or equal to 10.00, greater than or equal to 9.00 and less than or equal to 10.00, greater than or equal to 9.50 and less than or equal to 10.00, greater than or equal to 5.00 and less than or equal to 9.50, greater than or equal to 5.50 and less than or equal to 9.50, greater than or equal to 6.00 and less than or equal to 9.50, greater than or equal to 6.50 and less than or equal to 9.50, greater than or equal to 7.00 and less than or equal to 9.50, greater than or equal to 7.50 and less than or equal to 9.50, greater than or equal to 8.00 and less than or equal to 9.50, greater than or equal to 8.50 and less than or equal to 9.50, greater than or equal to 9.00 and less than or equal to 9.50, greater than or equal to 5.00 and less than or equal to 9.00, greater than or equal to 5.50 and less than or equal to 9.00, greater than or equal to 6.00 and less than or equal to 9.00, greater than or equal to 6.50 and less than or equal to 9.00, greater than or equal to 7.00 and less than or equal to 9.00, greater than or equal to 7.50 and less than or equal to 9.00, greater than or equal to 8.00 and less than or equal to 9.00, greater than or equal to 8.50 and less than or equal to 9.00, greater than or equal to 5.00 and less than or equal to 8.50, greater than or equal to 5.50 and less than or equal to 8.50, greater than or equal to 6.00 and less than or equal to 8.50, greater than or equal to 6.50 and less than or equal to 8.50, greater than or equal to 7.00 and less than or equal to 8.50, greater than or equal to 7.50 and less than or equal to 8.50, greater than or equal to 8.00 and less than or equal to 8.50, greater than or equal to 5.00 and less than or equal to 8.00, greater than or equal to 5.50 and less than or equal to 8.00, greater than or equal to 6.00 and less than or equal to 8.00, greater than or equal to 6.50 and less than or equal to 8.00, greater than or equal to 7.00 and less than or equal to 8.00, greater than or equal to 7.50 and less than or equal to 8.00, greater than or equal to 5.00 and less than or equal to 7.50, greater than or equal to 5.50 and less than or equal to 7.50, greater than or equal to 6.00 and less than or equal to 7.50, greater than or equal to 6.50 and less than or equal to 7.50, greater than or equal to 7.00 and less than or equal to 7.50, greater than or equal to 5.00 and less than or equal to 7.00, greater than or equal to 5.50 and less than or equal to 7.00, greater than or equal to 6.00 and less than or equal to 7.00, greater than or equal to 6.50 and less than or equal to 7.00, greater than or equal to 5.00 and less than or equal to 6.50, greater than or equal to 5.50 and less than or equal to 6.50, greater than or equal to 6.00 and less than or equal to 6.50, greater than or equal to 5.00 and less than or equal to 6.00, greater than or equal to 5.50 and less than or equal to 6.00, or greater than or equal to 5.00 and less than or equal to 5.50, where the sound waves have a frequency that is greater than or equal to 5100 Hz and less than or equal to 5400 Hz.

In one or more embodiments, the transmission coefficient of sound in the second direction (i.e., the direction in which sound waves are beamed) is greater than or equal to 0.40, where the sound waves have a frequency that is greater than or equal to 5100 Hz and less than or equal to 5400 Hz. In embodiments, the coefficient of sound in the second direction is greater than or equal 0.40 and less than or equal to 0.60, such as greater than or equal 0.45 and less than or equal to 0.60, greater than or equal 0.50 and less than or equal to 0.60, greater than or equal 0.55 and less than or equal to 0.60, greater than or equal 0.40 and less than or equal to 0.55, greater than or equal 0.45 and less than or equal to 0.55, greater than or equal 0.50 and less than or equal to 0.55, greater than or equal 0.40 and less than or equal to 0.50, greater than or equal 0.45 and less than or equal to 0.50, or greater than or equal 0.40 and less than or equal to 0.45, where the sound waves have a frequency that is greater than or equal to 5100 Hz and less than or equal to 5400 Hz. The transmission coefficient of sound in the second direction is determined by comparing the portion of the energy beamed in the second direction to the energy in all four directions. The energy propagating along four directions is computed by integrating the intensity I over the four sides of the phononic crystal resulting in the energy $E=\int I\cdot ndL$, where n is the normal vector, L is the edge length of the bounding rectangular box in the wave propagation direction. The transmission coefficient is then calculated by taking the ratio of the energy propagating in the second direction to the total energy.

A first aspect includes a method for beaming sound waves comprising: introducing sound waves into a phononic crystal in a first direction, the phononic crystal comprising an array of C-shaped structures oriented so that a neck of each of the C-shaped structures is facing the same general direction; and beaming the sound waves in the direction in which the neck of each of the C-shaped structures is facing so that the sound waves are beamed from the phononic crystal in a second direction that is different from the first direction.

A second aspect includes the method for beaming sound waves of the first aspect, wherein the second direction is from 45° to 135° relative to the first direction.

A third aspect includes the method for beaming sound waves of any one of the first or second aspects, wherein the second direction is from 75° to 105° relative to the first direction.

A fourth aspect includes the method for beaming sound waves of any one of the first to third aspects, wherein the second direction is approximately 90° relative to the first direction.

A fifth aspect includes the method for beaming sound waves of any one of the first to fourth aspects, wherein the array of C-shaped structures comprises a plurality of C-shaped structures arranged in columns and rows.

A sixth aspect includes the method for beaming sound waves of any one of the first to fifth aspects, wherein a distance between adjacent C-shaped structures satisfies the following equation:

$$f=\frac{c}{d}$$

wherein f is the (center) frequency of the sound waves entering the phononic crystal; c is the speed of sound in air; and d is the distance between adjacent C-shaped structures.

A seventh aspect includes the method for beaming sound waves of any one of the first to sixth aspects, wherein an outer radius of the C-shaped structures satisfies the following equation:

$$kr_o\approx 1$$

wherein k is the wave number and $r_o$ is the outer radius of the C-shaped structure.

An eighth aspect includes the method for beaming sound waves of any one of the first to seventh aspects, wherein a distance between adjacent C-shaped structures satisfies the following equation:

$$n\lambda=2d\sin\theta$$

wherein n is the order of Bragg scattering, is the wavelength of sound waves to be beamed, d is the distance between adjacent C-shaped structures in the array of C-shaped structures, and θ is an angle of a neck of C-shaped structures relative to a line perpendicular to the first direction.

A ninth aspect includes the method for beaming sound waves of any one of the first to eighth aspects, wherein a transmission ratio of an intensity of the sound waves in the first direction to sound waves in the second direction is greater than 5, and the sound waves have a frequency of greater than 5100 Hz and less than 5400 Hz.

A tenth aspect includes the method for beaming sound waves of any one of the first to ninth aspects, wherein a transmission coefficient of the sound waves in the second direction is greater than 0.4, and the sound waves have a frequency of greater than or 5100 phononic crystal comprising: an array of C-shaped structures oriented so that a neck of each of the C-shaped structures is facing the same general direction; and the C-shaped structures are configured so that the neck of each of the C-shaped structures is positioned to face a second direction that is different from a direction of sound waves incident to the phononic crystal.

A twelfth aspect includes the phononic crystal of the eleventh aspect, wherein the second direction is from 45° to 135° relative to the direction of incident sound waves.

A thirteenth aspect includes the phononic crystal of any one of the eleventh or twelfth aspects, wherein the second direction is from 75° to 105° relative to the direction of incident sound waves.

A fourteenth aspect includes the phononic crystal of any one of the eleventh to thirteenth aspects, wherein the second direction is approximately 90° relative to the direction of incident sound waves.

A fifteenth aspect includes the phononic crystal of any one of the eleventh to fourteenth aspects, wherein the array of C-shaped structures comprises a plurality of C-shaped structures arranged in columns and rows.

A sixteenth aspect includes the phononic crystal of any one of the eleventh to fifteenth aspects, wherein a distance between adjacent C-shaped structures satisfies the following equation:

$$f = \frac{c}{d}$$

wherein f is the (center) frequency of the sound waves entering the phononic crystal; c is the speed of sound in air; and d is the distance between adjacent C-shaped structures.

A seventeenth aspect includes the phononic crystal of any one of the eleventh to sixteenth aspects, wherein an outer radius of the C-shaped structures satisfies the following equation:

$$kr_o \approx 1$$

wherein k is the wave number and $r_o$ is the outer radius of the C-shaped structure.

An eighteenth aspect includes the phononic crystal of any one of the eleventh to seventeenth aspects, wherein a distance between adjacent C-shaped structures satisfies the following equation:

$$n\lambda = 2d \sin\theta$$

wherein n is the order of Bragg scattering, λ is the wavelength of sound waves to be beamed, d is the distance between adjacent C-shaped structures in the array C-shaped structures, and θ is an angle of a neck of C-shaped structures relative to the first direction.

EXAMPLES

Embodiments will be further clarified by the following examples.

Example 1

Figure 4A:
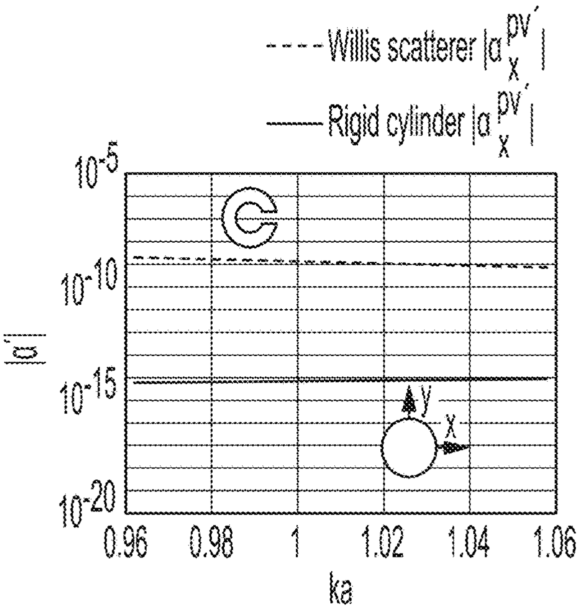
FIG. 4A is a graph showing dipole scattering coefficients versus an incident wave for a C-shaped structure according to embodiments disclosed and described herein and for a rigid cylinder.
Figure 4B:
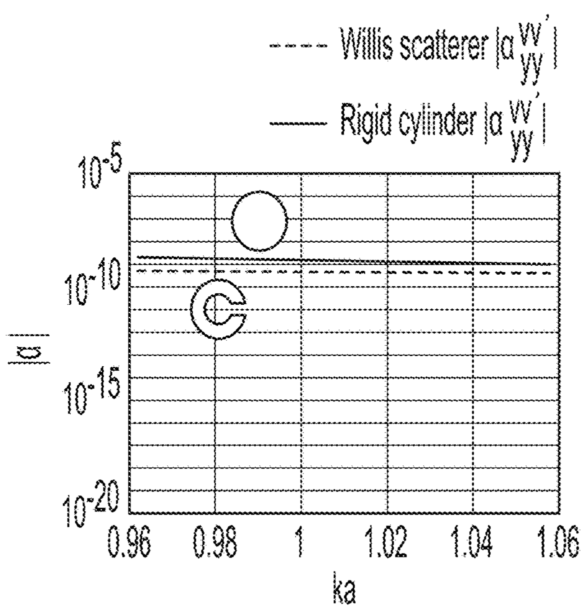
FIG. 4B is a graph showing the pressure excited dipole versus the strength of the velocity excited dipole of a C-shaped structure according to embodiments disclosed and described herein and a rigid cylinder.

The dipole scattering properties of the C-shaped structures disclosed and described herein are studied and presented FIG. 4A and FIG. 4B as compared to the properties of a rigid cylinder. The acoustic medium surrounding the C-shaped structure and the rigid cylinder is air. FIG. 4A shows the dipole scattering coefficients along the x-axis for a wave incident along the +y-axis. The results for the rigid cylinder of the same radius is also plotted for comparison. The pressure excited dipole moment (orthogonal to the incident direction) from the C-shaped structure is more than five orders of magnitude higher than the coefficients from a rigid cylinder. This difference is due to the fact the C-shaped structure is asymmetric about the y-axis which caused pressure-velocity cross-coupling. The pressure excited dipole (orthogonal to the incident direction) is comparable to the strength of the velocity excited dipole (along the incident direction) as shown in FIG. 4B. By taking advantage of the cross-coupling in the C-shaped structures, the asymmetric lateral beaming effect shown in FIG. 3 as discussed above is possible. The coefficients used above were calculated in accordance with Su et al., Retrieval Method for the Bianstropic Polarizability Tensor of Willis Acoustic Scatterers, 98 Physical Review 1743005 (2018).

Example 2

Figure 5A:
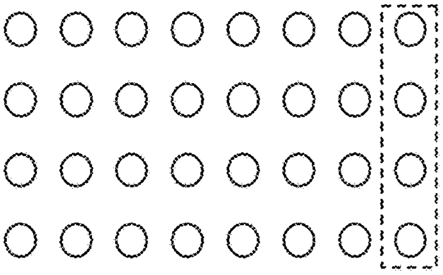
FIG. 5A is a schematic showing an array of rigid cylinders.
Figure 5B:
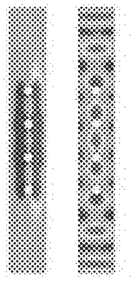
FIG. 5B is an image showing the interaction of energy waves with a column of rigid cylinders.
Figure 5C:
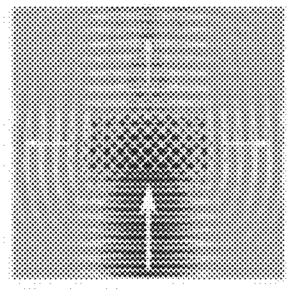
FIG. 5C is an image showing the interaction of energy waves with an array of rigid cylinders.

As shown in FIG. 5A, a cluster of rigid cylinders (8×4 array) with a cylinder radius r of 1.05 cm were arranged in a square lattice pattern with a constant d of 6.466 cm between adjacent cylinders. The first anti-symmetric and symmetric modes for r of 1.05 cm are displayed in FIG. 5B. The anti-symmetric mode at 4924.9 Hz is a dipole mode in the unit cell, which cannot be excited by a normally incident sound. However, the symmetric mode at 5283.9+i·173.39 Hz is a quadrupole mode in the unit cell and couples to the incident wave. It is noted that the frequency of the symmetric mode not only has a real part close to 5305 Hz, but also has an imaginary component. The imaginary component leads to substantial spatial effect of the mode (i.e., leaky guided mode) in a phononic crystal. FIG. 5C shows the simulation result obtained using COMSOL Multiphysics at 5305 Hz. It shows that the beams along x-directions are symmetric since the quadrupole mode is symmetric.

Figure 6A:
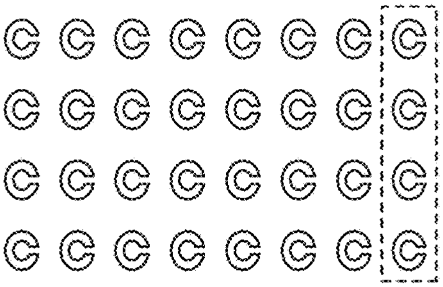
FIG. 6A is a schematic showing an array of C-shaped structures according to embodiments disclosed and described herein.
Figure 6B:
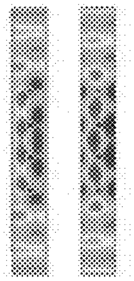
FIG. 6B is an image showing the interaction of energy waves with a column of C-shaped structures according to embodiments disclosed and described herein.
Figure 6C:
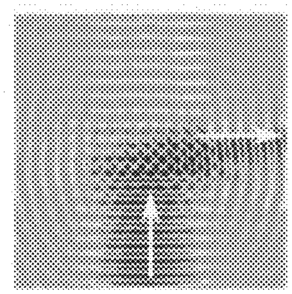
FIG. 6C is an image showing the interaction of energy waves with an array of C-shaped structures according to embodiments disclosed and described herein.

The phononic crystal comprised of C-shaped structures as disclosed and described herein is shown in FIG. 6A. The outer radius of the C-shaped structure $r_o$ was 1.05 cm, the inner radius $r_i$ was 0.47 cm, and the neck width w was 0.5 cm. The distance between adjacent C-shaped structures d is 6.466 cm corresponding to strongest Bragg scattering at 5305 Hz for normally incident sound. The geometries were tailored so that the two modes shown in FIG. 6B are both close to 5305 Hz. It was observed from the mode shapes that they are coupled to the propagating wave along the y-direction. Both of the two resonant frequencies (5158.3+i·81.583 Hz and 8280.4+i·71.982 Hz) had substantial imaginary components, leading to spatial effect along the x-axis in the phononic crystal. Due to the symmetry (anti-symmetry) of the two leaky guided modes, destructive interference along the −x-axis decreased the transmission while constructive interference along the +x-axis increased the transmission. Hence, the asymmetric lateral beaming effect was achieved as shown in simulation results in FIG. 6C.

Example 3

Figure 7A:
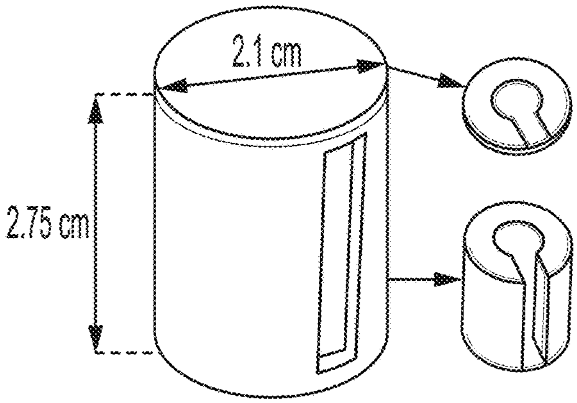
FIG. 7A is a schematic depicting a C-shaped structure according to embodiments disclosed and described herein.
Figure 7B:
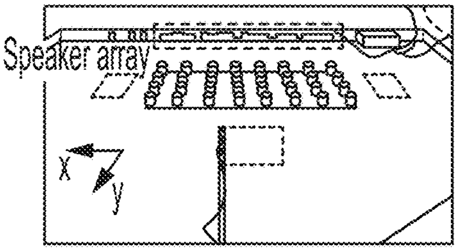
FIG. 7B is a schematic depicting a test set-up for transmitting energy waves through an array of structures.
Figure 7C:
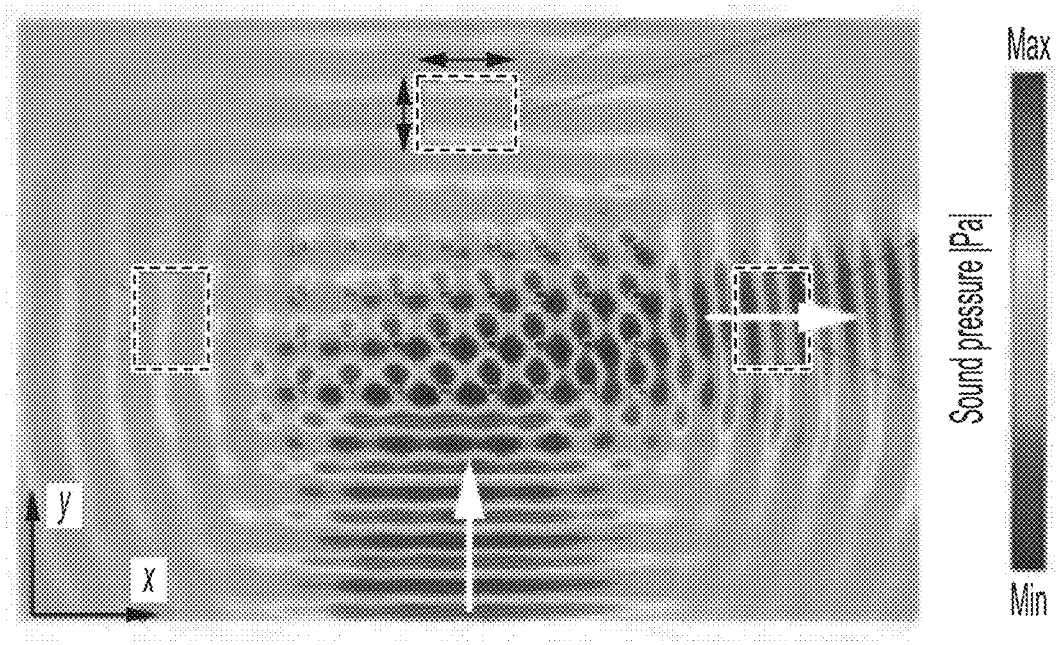
FIG. 7C is an image showing the transmission of energy waves across an array of C-shaped structures according to embodiments disclosed and described herein
Figure 7D:
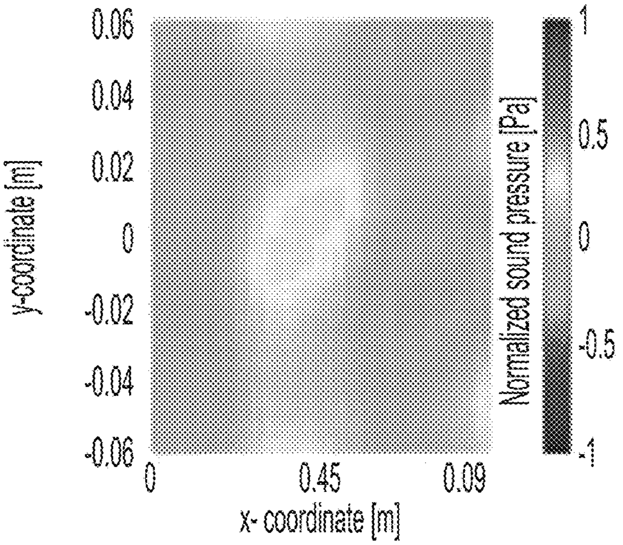
FIG. 7D is a magnified image showing the pressure field at the dotted square in the left portion of FIG. 7C.
Figure 7E:
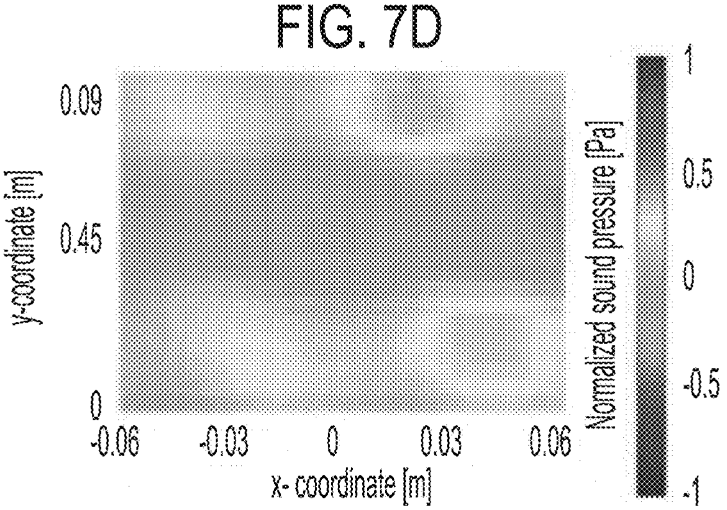
FIG. 7E is a magnified image showing the pressure field at the dotted square in the top portion of FIG. 7C.
Figure 7F:
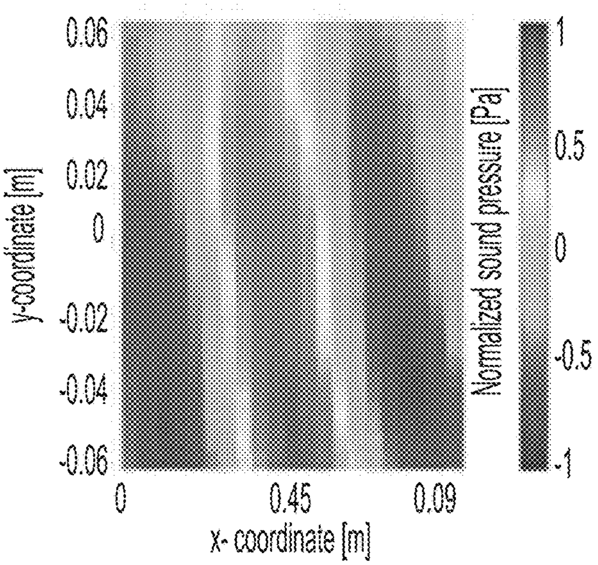
FIG. 7F is a magnified image showing the pressure field at the dotted square in the right portion of FIG. 7C.

Acoustic measurements were done to demonstrate the performance of the asymmetric lateral beaming effect. A total number of 32 C-shaped structures were fabricated by using stereolithography of grey resin. The C-shaped structure was fabricated in two parts with a body 2.6 cm-tall and a cover 0.15 cm thick as shown in FIG. 7A. The Young's modulus of the fabricated structure was 2.8 GPa and the density was 1.78 kg/m 3. The experimental apparatus shown in FIG. 7B was used. The C-shaped structures were arranged in a square lattice pattern with a distance between adjacent C-shaped structures of 6.466 cm. A speaker unit 30 cm away from the C-shaped structures generated a plane wave ranging from 3 kHz to 7 kHz. Sound pressure fields were measured in three 12.5 cm×9.4 cm areas as marked in FIG. 7C. The measured pressure fields at 5305 Hz in the aforementioned three areas were plotted in FIG. 7D to FIG. 7F. Specifically, FIG. 7 D shows a magnification of the dotted square portion at the left side of FIG. 7C, FIG. 7E shows a magnification of the dotted square portion at the top of FIG. 7C, and FIG. 7F shows a magnification of the dotted square portion at the right of FIG. 7C. As can be seen, the simulated sound wave was incident along the +y-axis and transmits through the structure along the +x-axis. The measured pressure fields were normalized to the maximum amplitude in the three areas shown in FIG. 7D, FIG. 7E, and FIG. 7F. The amplitude of the pressure field in FIG. 7F is significantly higher than that in FIG. 7D and FIG. 7E. The results clearly show the asymmetric lateral beaming effect in the fabricated structures.

Figure 8A:
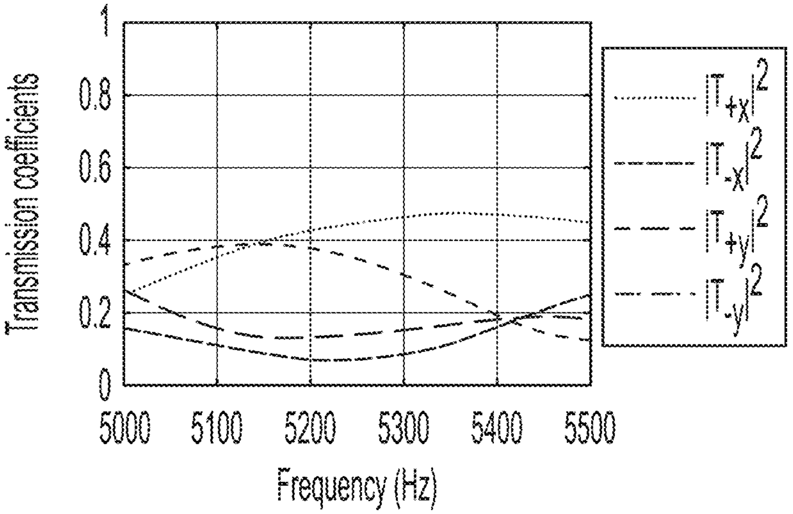
FIG. 8A is a graph showing transmission coefficients versus frequency of the asymmetric lateral beaming effect.
Figure 8B:
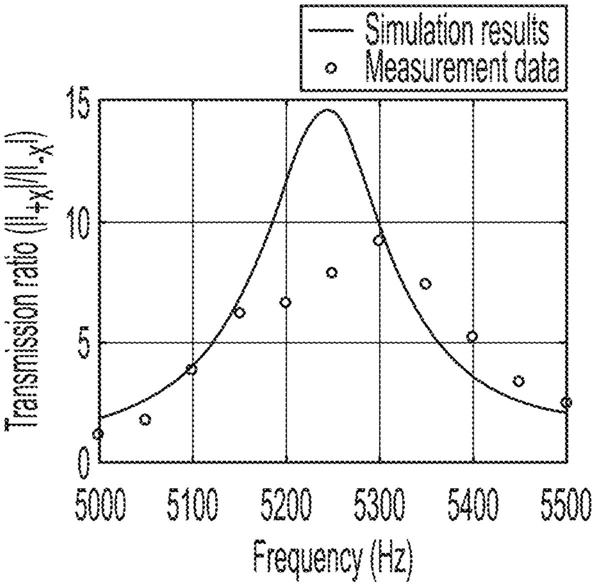
FIG. 8B is a graph showing the transmission ratios versus frequency of simulated data and measured results.

To quantify the asymmetric lateral beaming effect, the simulated energy transmission and reflection coefficients along four directions (x and y) were calculated. The energy propagating along four directions were computed by integrating the intensity I over the four sides of the phononic crystal resulting in the energy E=R I ndL. The results are plotted in FIG. 8A. The maximum transmission towards the +x-axis is about 47.2% at 5360 Hz. Due to the limitation of the measurement system, only limited areas along three directions were measured so that the corresponding coefficients could not be calculated the measurement data. However, the energy flux ratio was directly computed to the x-axis using measurement data and compared to that calculated in simulation. The results are presented in FIG. 8B. The measurement result show a maximum ratio of 9.27 at 5305 Hz between the energy transmitted to the +x-axis and the energy transmitted to the −x-axis. It is noted that the simulation data yielded a maximum ratio about 14.7 near 5240 Hz. The overall shape of the two curves match well except that the simulation results had a sharper peak shifted away from 5305 Hz. The difference between the measurement data and the simulation results was likely due to the alignment error of the C-shaped structures. The distance between the C-shaped structures are slightly different and their necks were not perfectly oriented towards the +x-direction, which may reduce the Bragg scattering and the strength of the resonant modes. These were manufacturing abnormalities that likely could be ameliorated in production. Another reason is that the pressure field may not be evenly distributed along y-axis, more energy may be redirected to areas nearby the dashed rectangular areas and changed the energy flux ratio in measurement results. Other than the aforementioned discrepancy, the design showed a broadband asymmetric lateral beaming effect with an energy transmission ratio of at least 5 within 5125 to 5400 Hz.

Example 4

Figure 9:
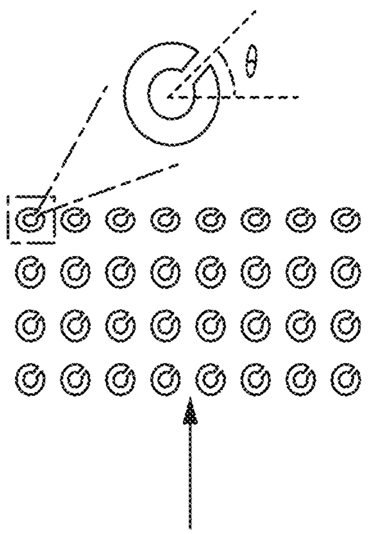
FIG. 9 is a schematic showing an array of C-shaped structures according to embodiments disclosed and described herein.
Figures 10A, 10B, 10C:
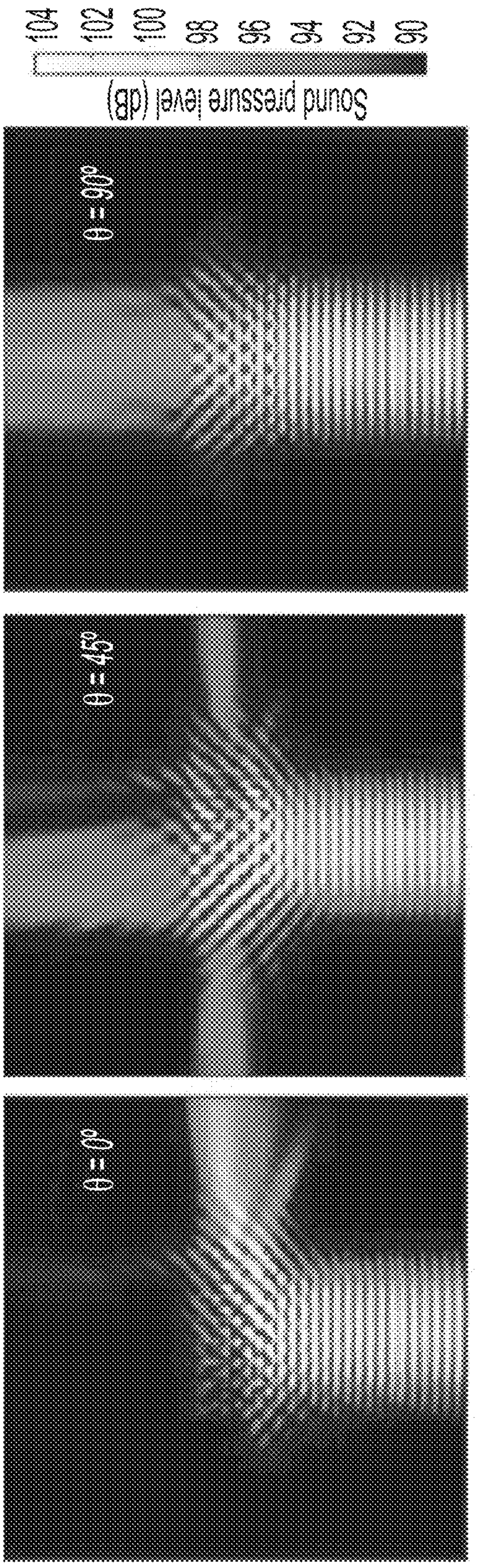
FIG. 10A is an image showing the interaction of energy waves through an array of C-shaped structures according to embodiments disclosed and described herein where the angle θ is 0°.
FIG. 10B is an image showing the interaction of energy waves through an array of C-shaped structures according to embodiments disclosed and described herein where the angle θ is 45°.
FIG. 10C is an image showing the interaction of energy waves through an array of C-shaped structures according to embodiments disclosed and described herein where the angle θ is 90°.

The performance of the phononic crystal is sensitive to the position of the neck of the C-shaped structures. The demonstrated performance when θ is zero degrees was extremely asymmetric because both the symmetric and antisymmetric modes are excited by the incident wave. However, the two modes change as the angle θ increases. When the angle θ equals 90 degrees, the antisymmetric mode was not excited so that the waves along the lateral direction are symmetric and were reduced. FIG. 9 shows the orientation of the angle θ in the phononic crystal, where θ is measured relative to a line that is perpendicular to the direction of sound waves (indicated by the arrow in FIG. 9) incident to the phononic crystal. The simulated performance for three different angles of θ are plotted in FIG. 10A to FIG. 10C. Specifically, FIG. 10A shows the simulated results when θ is 0°, FIG. 10B shows the simulated results when θ is 45°, and FIG. 10C shows the simulated results when θ is 90°. The results in FIG. 10A to FIG. 10C show that the phononic crystal according to embodiments disclosed and described herein can be reconfigured to control the direction of the transmitted sound waves. (Although not shown, we note that if θ is 135°, the transmitted sound wave is towards the left side of the phononic crystal).

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for beaming sound waves comprising:

introducing sound waves into a phononic crystal in a first direction, the phononic crystal comprising an array of C-shaped structures oriented so that a neck of each of the C-shaped structures is facing the same general direction, wherein an outer radius of the C-shaped structures satisfies the following equation:

$$kr_o \approx 1$$

wherein k is the wave number and $r_o$ is the outer radius of the C-shaped structure; and a distance between adjacent C-shaped structures satisfies the following equation:

$$n\lambda = 2d \sin \theta$$

wherein n is the order of Bragg scattering, λ is the wavelength of sound waves to be beamed, d is the distance between adjacent C-shaped structures in the array of C-shaped structures, and θ is an angle of a neck of C-shaped structures relative to a line perpendicular to the first direction; and beaming the sound waves in the direction in which the neck of each of the C-shaped structures is facing so that the sound waves are beamed from the phononic crystal in a second direction that is different from the first direction.

2. The method for beaming sound waves of claim 1, wherein the second direction is from 45° to 135° relative to the first direction.

3. The method for beaming sound waves of claim 1, wherein the second direction is from 75° to 105° relative to the first direction.

4. The method for beaming sound waves of claim 1, wherein the second direction is approximately 90° relative to the first direction.

5. The method for beaming sound waves of claim 1, wherein the array of C-shaped structures comprises a plurality of C-shaped structures arranged in columns and rows.

6. The method for beaming sound waves of claim 5, wherein a distance between adjacent C-shaped structures satisfies the following equation:

$$f = \frac{c}{d}$$

wherein f is the (center) frequency of the sound waves entering the phononic crystal; c is the speed of sound in air; and d is the distance between adjacent C-shaped structures.

7. The method for beaming sound waves according to claim 1, wherein a transmission ratio of an intensity of the sound waves in the first direction to sound waves in the second direction is greater than 5, and the sound waves have a frequency of greater than 5100 Hz and less than 5400 Hz.

8. The method for beaming sound waves according to claim 1, wherein a transmission coefficient of the sound waves in the second direction is greater than 0.4, and the sound waves have a frequency of greater than or 5100 Hz and less than 5400 Hz.

9. A phononic crystal comprising:

an array of C-shaped structures oriented so that a neck of each of the C-shaped structures is facing the same general direction, wherein an outer radius of the C-shaped structures satisfies the following equation:

$$kr_o \approx 1$$

wherein k is the wave number and $r_o$ is the outer radius of the C-shaped structure; and a distance between adjacent C-shaped structures satisfies the following equation:

$$n\lambda = 2d \sin\theta$$

wherein n is the order of Bragg scattering, $\lambda$ is the wavelength of sound waves to be beamed, d is the distance between adjacent C-shaped structures in the array of C-shaped structures, and $\theta$ is an angle of a neck of C-shaped structures relative to a line perpendicular to the first direction; and the C-shaped structures are configured so that the neck of each of the C-shaped structures is positioned to face a second direction that is different from a direction of sound waves incident to the phononic crystal.

10. The phononic crystal of claim 9, wherein the second direction is from 45° to 135° relative to the direction of incident sound waves.

11. The phononic crystal of claim 9, wherein the second direction is from 75° to 105° relative to the direction of incident sound waves.

12. The phononic crystal of claim 9, wherein the second direction is approximately 90° relative to the direction of incident sound waves.

13. The phononic crystal of claim 9, wherein the array of C-shaped structures comprises a plurality of C-shaped structures arranged in columns and rows.

14. The phononic crystal of claim 13, wherein a distance between adjacent C-shaped structures satisfies the following equation:

$$f = \frac{c}{d}$$

wherein f is the (center) frequency of the sound waves entering the phononic crystal; c is the speed of sound in air; and d is the distance between adjacent C-shaped structures.

* * * * *